United States Patent
Kocienda et al.

(10) Patent No.: US 7,602,378 B2
(45) Date of Patent: Oct. 13, 2009

(54) METHOD, SYSTEM, AND GRAPHICAL USER INTERFACE FOR SELECTING A SOFT KEYBOARD

(75) Inventors: Kenneth Kocienda, Sunnyvale, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 537 days.

(21) Appl. No.: 11/553,431

(22) Filed: Oct. 26, 2006

(65) Prior Publication Data

US 2008/0259039 A1    Oct. 23, 2008

(51) Int. Cl.
*G09G 5/00*    (2006.01)

(52) U.S. Cl. .................. 345/169; 345/168; 715/808; 715/840

(58) Field of Classification Search ............... 345/168, 345/169, 171, 173; 715/702, 780, 808, 840; 715/864; 400/485; 178/18.01; 341/22, 28; 379/93.19
See application file for complete search history.

(56) References Cited

U.S. PATENT DOCUMENTS

| | | | |
|---|---|---|---|
| 4,202,041 A | 5/1980 | Kaplow et al. .............. 364/900 |
| 4,803,463 A | 2/1989 | Sado ........................... 341/23 |
| 5,128,672 A | 7/1992 | Kaehler ........................ 341/23 |
| 5,276,794 A * | 1/1994 | Lamb, Jr. .................... 715/202 |
| 5,581,243 A | 12/1996 | Ouellette et al. ............ 345/173 |
| 5,736,974 A | 4/1998 | Selker ......................... 345/146 |
| 5,825,362 A | 10/1998 | Retter ......................... 345/357 |
| 5,936,614 A | 8/1999 | An et al. ..................... 345/173 |
| 5,963,671 A * | 10/1999 | Comerford et al. .......... 382/230 |
| 6,067,074 A | 5/2000 | Lueders ...................... 345/156 |
| 6,121,960 A | 9/2000 | Carroll et al. ............... 345/173 |
| 6,491,630 B1 * | 12/2002 | Saccardo et al. ............. 600/437 |
| 2002/0167545 A1 | 11/2002 | Kang et al. ................. 345/780 |
| 2004/0160419 A1 | 8/2004 | Padgitt ....................... 345/173 |
| 2004/0261038 A1 | 12/2004 | Ording et al. ............... 715/792 |
| 2005/0231514 A1 | 10/2005 | Harper et al. ............... 345/501 |
| 2006/0033724 A1 | 2/2006 | Chaudhri et al. ............ 345/173 |

FOREIGN PATENT DOCUMENTS

GB    2 337 349 A    11/1999
WO   WO 2004/051392 A2   6/2004

OTHER PUBLICATIONS

Invitation to Pay Additional Fees for International application No. PCT/US2007/060119 (related case), dated Jan. 2, 2008.
Esato, "A Couple of My Mates. Meet JasJar and K-Jam (Many Pics)," 90 pages, Apr. 13, 2006.

* cited by examiner

*Primary Examiner*—Abbas I Abdulselam
(74) *Attorney, Agent, or Firm*—Morgan, Lewis & Bockius LLP (57) ABSTRACT

A portable electronic device may display one of a plurality of soft keyboards in a first display area and input characters in a second display area. The user may select a key on the soft keyboard, causing a plurality of objects corresponding to the plurality of soft keyboards to be displayed. The user may then select one of the objects, and the soft keyboard corresponding to the selected object is displayed and made operational. The soft keyboards corresponding to the objects not selected are not made operational.

21 Claims, 9 Drawing Sheets

METHOD, SYSTEM, AND GRAPHICAL USER INTERFACE FOR SELECTING A SOFT KEYBOARD

TECHNICAL FIELD

The disclosed embodiments relate generally to user interfaces, and more particularly, to methods, systems, and graphical user interfaces for selecting a soft keyboard from a plurality of soft keyboards.

BACKGROUND

As portable electronic devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable electronic devices (e.g., mobile telephones, sometimes called mobile phones, cell phones, cellular telephone, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Some portable devices now have user interfaces based on a touch-sensitive display (also known as a "touch screen"). The user interacts with a graphical user interface via the touch-sensitive display. The user may operate the interface with a stylus or a digit (e.g., a finger). These devices typically include soft keyboards for character input. Some portable devices have a plurality of soft keyboards. When a user enters characters into the device, he may need to switch between the multiple keyboards in order to find the character keys he needs. A user who is not familiar with the layouts of the keyboards may look through each of the keyboards in order to find the keyboard with the needed key. This is time consuming and makes the character input process inefficient.

Accordingly, there is a need for more efficient ways to select a soft keyboard from a plurality of soft keyboards.

SUMMARY

The above deficiencies and other problems associated with user interfaces for portable devices are reduced or eliminated by including an interface for selecting a soft keyboard from a plurality of soft keyboards.

According to some embodiments, a computer-implemented method includes, at a portable electronic device, displaying a single soft keyboard in a first area and a window in a second area on a display of the portable electronic device, wherein the window is configured to display characters selected using a plurality of soft keyboards. The method also includes displaying simultaneously a plurality of objects that correspond to the plurality of soft keyboards in response to an input by a user, and, in response to selection of one of the plurality of objects by the user, displaying in the first area the soft keyboard that corresponds to the selected object and making operational, of the plurality of soft keyboards, only the soft keyboard corresponding to the selected object.

According to some embodiments, a graphical user interface on a portable electronic device includes a first area that displays a soft keyboard; a keyboard selection soft key; an area that, in response to selection of the keyboard selection soft key by a user, displays simultaneously a plurality of objects that correspond to a plurality of soft keyboards; and a second area with a window that is configured to display characters selected using the plurality of soft keyboards, wherein selection of an object in the plurality of objects by the user determines the soft keyboard displayed in the first area.

According to some embodiments, a portable electronic device includes a display, one or more processors, memory, and a program, wherein the program is stored in the memory and configured to be executed by the one or more processors. The program includes instructions for displaying a single soft keyboard in a first area and a window in a second area on a display of the portable electronic device, wherein the window is configured to display characters selected using a plurality of soft keyboards; instructions for, in response to an input by a user, displaying simultaneously a plurality of objects that correspond to the plurality of soft keyboards; and instructions for, in response to selection of one of the plurality of objects by the user, displaying in the first area the soft keyboard that corresponds to the selected object and making operational, of the plurality of soft keyboards, only the soft keyboard corresponding to the selected object.

According to some embodiments, a computer-program product includes a computer readable storage medium and a computer program mechanism embedded therein. The computer program mechanism includes instructions, which when executed by a portable electronic device with a display, cause the device to display a single soft keyboard in a first area and a window in a second area on a display of the portable electronic device, wherein the window is configured to display characters selected using a plurality of soft keyboards; in response to an input by a user, display simultaneously a plurality of objects that correspond to the plurality of soft keyboards; and in response to selection of one of the plurality of objects by the user, display in the first area the soft keyboard that corresponds to the selected object and making operational, of the plurality of soft keyboards, only the soft keyboard corresponding to the selected object.

According to some embodiments, a portable electronic device with a display includes means for displaying a single soft keyboard in a first area and a window in a second area on a display of the portable electronic device, wherein the window is configured to display characters selected using a plurality of soft keyboards; means for displaying simultaneously a plurality of objects that correspond to the plurality of soft keyboards in response to an input by a user; and means for displaying in the first area the soft keyboard that corresponds to the selected object and making operational, of the plurality of soft keyboards, only the soft keyboard corresponding to the selected object, in response to selection of one of the plurality of objects by the user.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Attention is now directed to an embodiment of a portable electronic device. In some embodiments, the device is a portable communications device such as a mobile telephone. The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel. For simplicity, in the discussion that follows, a portable communications device (e.g., a cellular telephone that may also contain other functions, such as SMS, PDA and/or music player functions) that includes a touch screen is used as an exemplary embodiment. It should be understood, however, that the user interfaces and associated processes may be applied to other devices, such as personal computers and laptops, which may include one or more other physical user-interface devices, such as a click wheel, a mouse and/or a joystick.

Figure 1:
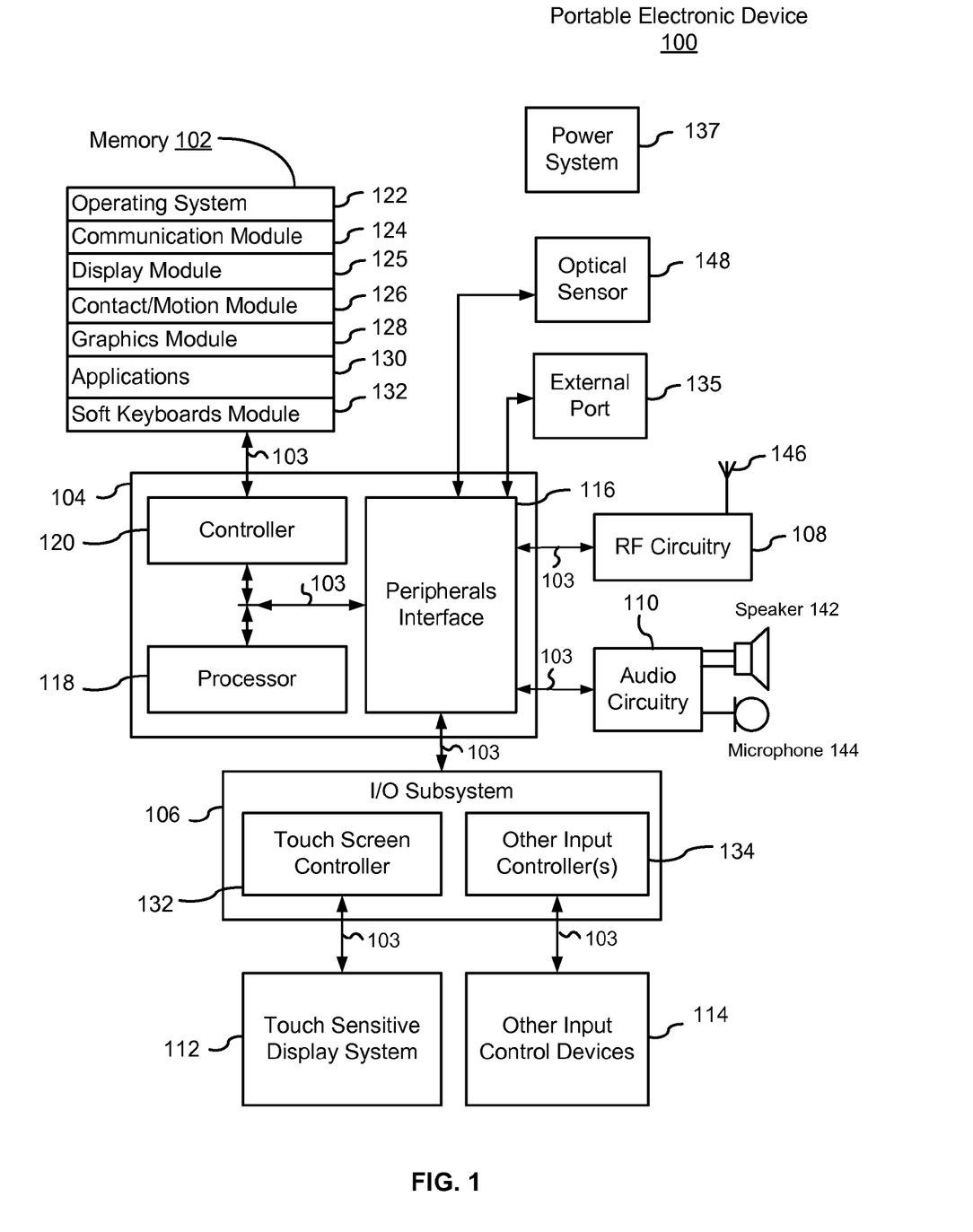
FIG. 1 is a block diagram illustrating a portable electronic device in accordance with some embodiments.

FIG. 1 is a block diagram illustrating an embodiment of a device 100, such as a portable electronic device having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

If the device 110 includes picture taking capabilities, the peripherals interface 116 is coupled to an optical sensor 148, such as a CMOS or CCD image sensor. The peripherals interface 116 is also coupled RF circuitry 108; audio circuitry 110; and/or an input/output (I/O) subsystem 106. The audio circuitry 110 may be coupled to a speaker 142 and a microphone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 includes a touch screen controller 132 and/or other input controller(s) 134. The touch-screen controller 132 is coupled to a touch-sensitive screen or touch sensitive display system 112. The touch screen 112 and touch screen controller 132 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. The touch-sensitive screen 112 may have a resolution in excess of 100 dpi. In an exemplary embodiment, the touch-sensitive screen 112 has a resolution of approximately 168 dpi. The other input controller(s) 134 may be coupled to other input/control devices 114, such as one or more buttons. In some alternate embodiments, input controller(s) 134 may be coupled to any (or none) of the following: a keyboard, infrared port, USB port, and a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 is used to implement virtual or soft buttons and one or more soft keyboards.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Computer, Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

Memory controller 120 may be coupled to memory 102 with one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 may support widgets, that is, modules or applications with embedded graphics. The widgets may be implemented using JavaScript, HTML, Adobe Flash, or other suitable computer program languages.

Memory 102 may also include one or more applications 130. Examples of applications that may be stored in memory 102 include email applications, text messaging or instant messaging applications, web browsers, memo pad applications, address books or contact lists, calendars, picture taking and management applications, and music playing and management applications.

Also in the memory 102 is a soft keyboard module 132. The soft keyboard module includes one or more soft keyboards (also known as "virtual keyboards") for entering characters into the device 100 via the touch screen 112. Each keyboard includes a palette of icons representing individual keys. In some embodiments, each key corresponds to an individual input character or an operation that may be activated. In some other embodiments, a key may correspond to multiple characters or operations, in which case the key is said to be overloaded. In some embodiments, the soft keyboards include one that consists primarily of letter keys, one that consists primarily of numeral keys, and one that consists primarily of symbol (e.g., punctuation) keys. As used herein, "primarily" means at least half. Thus, a numerals soft keyboard that consists primarily of numeral keys (sometimes called numeric keys) has at least half of its keys corresponding to numerals. In some embodiments, instead of a numerals soft keyboard, the soft keyboard module includes a "math soft keyboard" that has numeral keys, mathematical function keys (e.g., plus, minus, divide, multiply, equal sign, and optionally left and right parentheses) and optionally mathematical symbol keys (e.g., π, e, i, and the like) as at least half of its keys.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
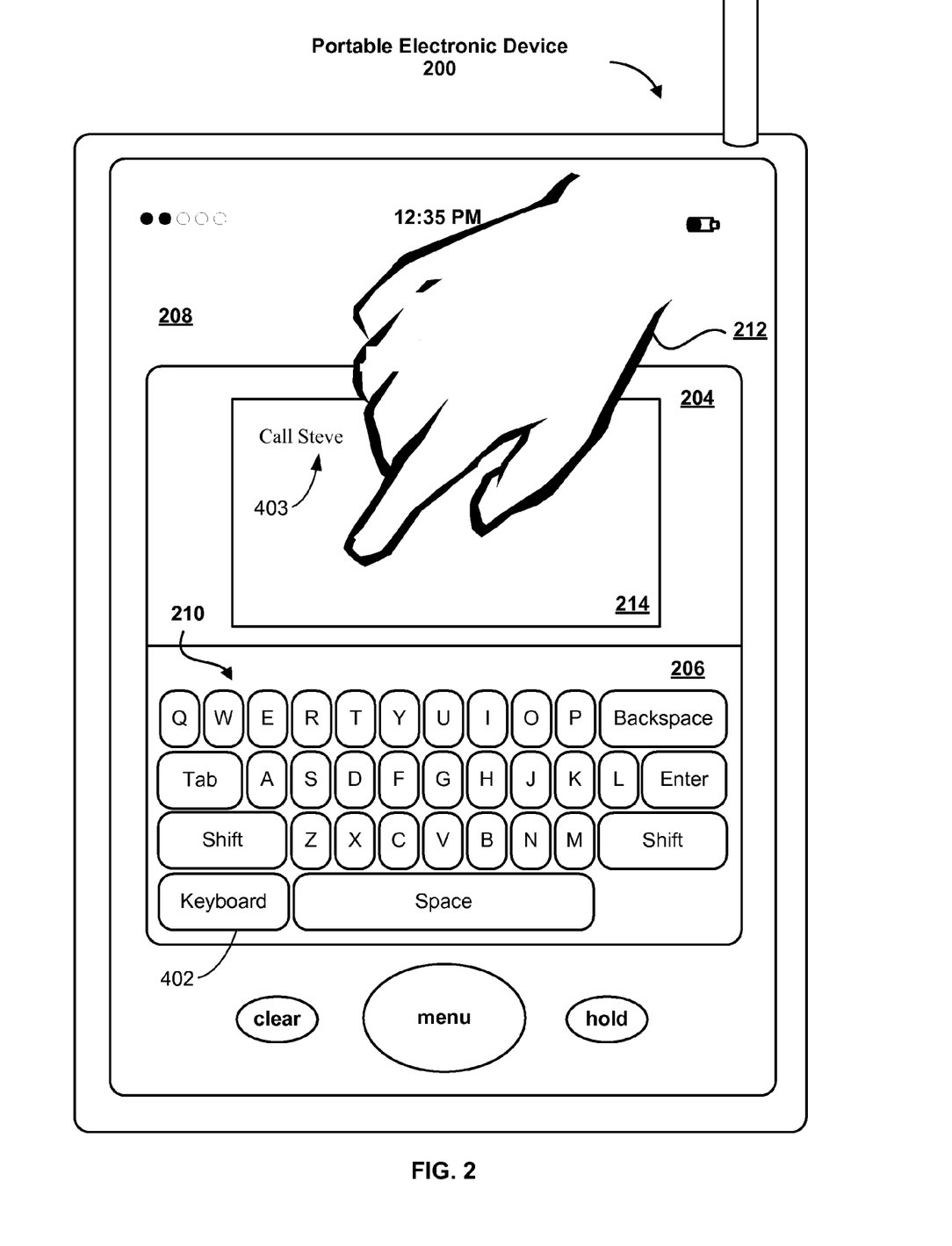
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. The touch screen may display one or more trays. A tray is a predefined region within a graphical user interface. One tray, such as a keyboard tray 206, may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of one or more icons occurs when the user breaks contact with the one or more icons. In some embodiments, the contact may include a gesture, such as one or more taps, one or more swipes (from left to right, right to left, upward and/or downward) and/or a rolling of a finger (from right to left, left to right, upward and/or downward) that has made contact with the device 200. In some embodiments, inadvertent contact with an icon may not select a corresponding symbol. For example, a swipe gesture that sweeps over an icon may not select a corresponding symbol when the gesture corresponding to selection is a tap.

The device 200 may include a display window 214 within a display tray 204. The display window 214 may display one or more of the characters and/or symbols, such as text 403, that are selected by the user. The device 200 may also include one or more physical buttons, such as the clear, hold and menu buttons shown in FIG. 2. The menu button may be used to navigate to any application in a set of applications that may be executed on the device 200. Alternatively, in some embodiments, the clear, hold, and/or menu buttons are implemented as soft keys in a graphical user interface in the touch screen 208.

Figure 3:
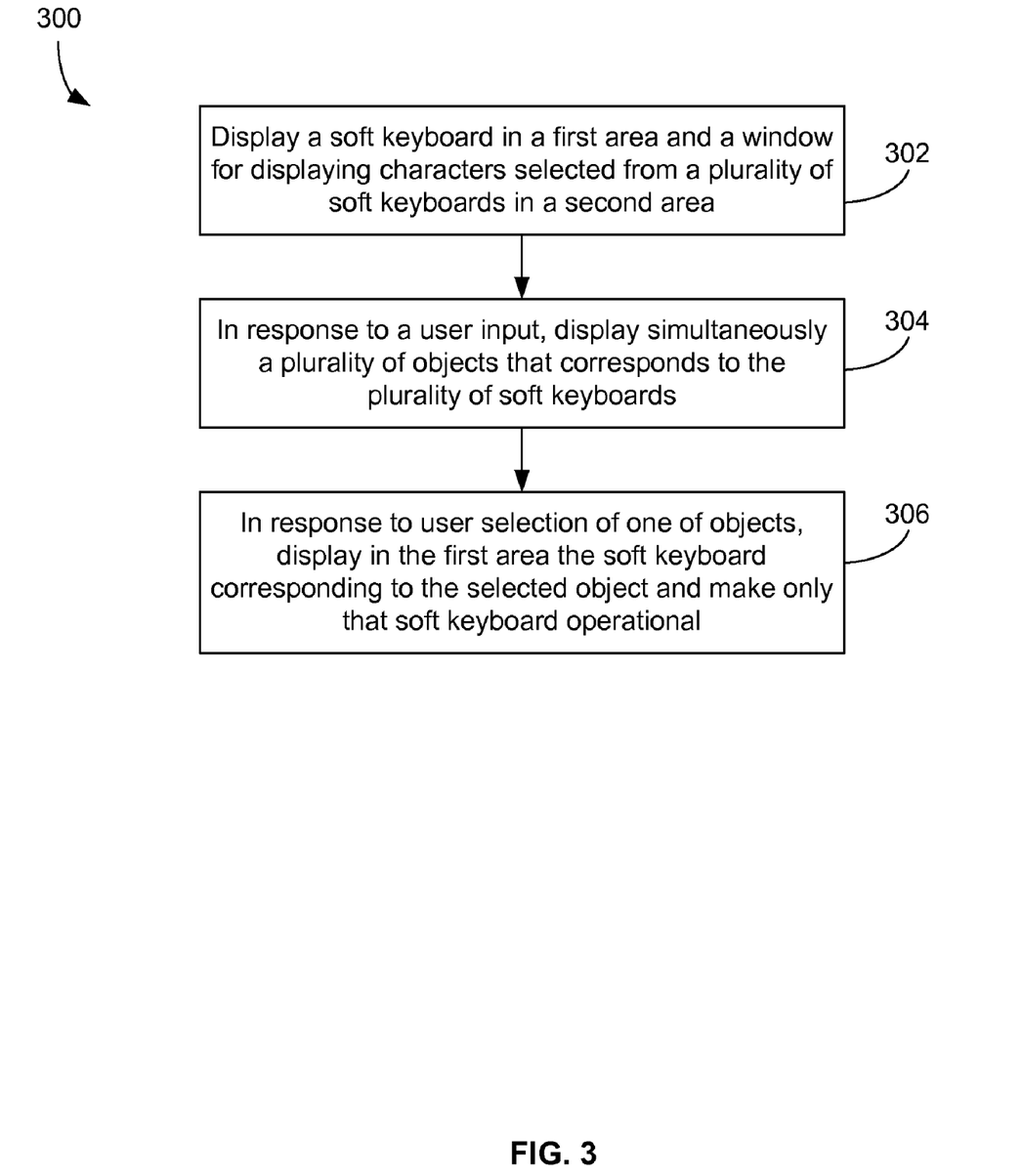
FIG. 3 is a flow diagram illustrating a process for selecting one of a plurality of soft keyboards and making the selected soft keyboard operational in accordance with some embodiments.

Attention is now directed to FIG. 3, which is a flow diagram illustrating a process flow 300 for selecting one of a plurality of soft keyboards and making the selected soft keyboard operational in accordance with some embodiments. A soft keyboard is displayed in a first area, and a window for displaying characters selected from a plurality of keyboards is displayed in a second area (302). The soft keyboard displayed in the first area, whichever keyboard it is, is operational; users may select the keys of the soft keyboard.

In response to a user input, a plurality of objects representing the plurality of soft keyboards is displayed simultaneously (304). The user input may include hitting a designated key (for example, keyboard selection soft key 402) on the displayed soft keyboard or performing a predefined gesture on the touch screen. In some embodiments, the plurality of objects is displayed in the first area, where the soft keyboard was displayed. In some other embodiments, the plurality of objects is displayed on top of the first and second areas, obscuring at least parts of the first and second areas and whatever content or objects are displayed in those areas. In further other embodiments, the plurality of objects is displayed in the second area, where the character display window is located. Each of the plurality of objects represents a distinct one of the plurality of soft keyboards. Thus, for example, if there is a letters keyboard, a numbers keyboard, and a symbols keyboard, then three objects corresponding to each one of the keyboards, are displayed. When the objects are displayed, the soft keyboard that was being displayed in the first area is made non-operational and no keyboard is made operational.

In response to user selection of one of the objects displayed, the soft keyboard corresponding to the selected object is displayed in the first area and made operational (306). The user selection includes the user making contact with the touch screen 208 over the area of the object corresponding to the keyboard he wishes to make operational. For example, the user may place or tap a finger on one of the objects on the touch screen to select that object. The objects corresponding to the soft keyboards are removed from display. In some embodiments, the soft keyboard corresponding to the selected object is the only keyboard made operational in response to the user selection; the other soft keyboards remain non-operational and are not displayed. That is, the user may activate keys in the soft keyboard corresponding to the selected object but not keys in the other soft keyboards. Whenever the user wishes to use another soft keyboard, operations 304-306 may be repeated.

In some embodiments, the objects are demagnified representations of the soft keyboards. In block 304, where the plurality of objects are displayed in response to a user input, the soft keyboard that is displayed in the first area may be demagnified, to become a demagnified keyboard object to be displayed simultaneously with demagnified representations of the other soft keyboards. In block 306, when a soft keyboard is displayed in response to user selection of one of the displayed objects, if the objects are demagnified representations of the soft keyboards, the selected demagnified keyboard object may be magnified in the first area to become the corresponding soft keyboard and the soft keyboard made operational. In some other embodiments, the objects are icons associated with the soft keyboards. In some embodiments, operation 306 includes a brief animation, having a duration of less than one second, in which the selected demagnified keyboard object smoothly transitions from an initial demagnified size to a full operational size. In some embodiments, the animation includes displaying the selected keyboard object in a series of at least ten increasing sizes. In one embodiment, the animation has a duration of about 300 milliseconds and has at least 15 magnification (increasing size) steps.

Figure 4A:
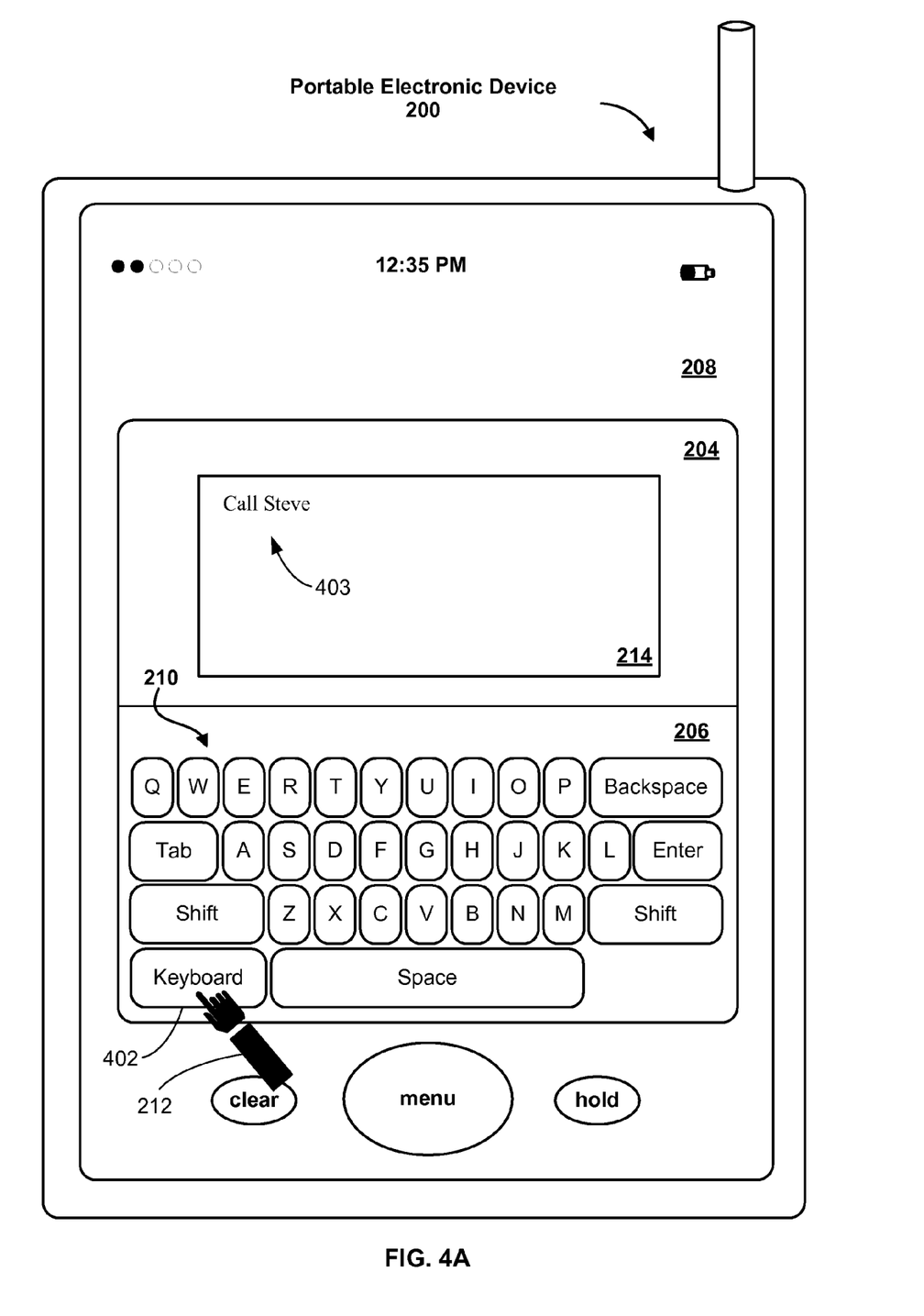
FIGS. 4A-4F illustrate a user interface for selecting a keyboard from a plurality of soft keyboards in accordance with some embodiments.

Attention is now directed to FIGS. 4A-4F, which illustrate user interfaces for selecting a keyboard from a plurality of soft keyboards in accordance with some embodiments. In FIG. 4A, a soft keyboard 210 that includes primarily letter keys is displayed in a keyboard tray 206 of the touch screen 208. Text 403 is displayed in a window 214 within the display tray 204. The text 403 may include characters selected by the user from the letters soft keyboard 210 and other soft keyboards, such as soft keyboard 216 of primarily numeral keys and a soft keyboard 218 of primarily symbol (e.g., punctuation) keys. The letters soft keyboard 210, as well as the numerals soft keyboard 216 and the symbols soft keyboard 218, may include a key 402 which, when selected by the user, activates the displaying of a plurality of objects corresponding to a plurality of soft keyboards. In some other embodiments, a user may activate the displaying of the objects corresponding to the soft keyboards by performing a predefined gesture (e.g., a swipe of the finger on the touch screen or a predefined number of taps in succession on the touch screen) on the touch screen 208.

Figure 4B:
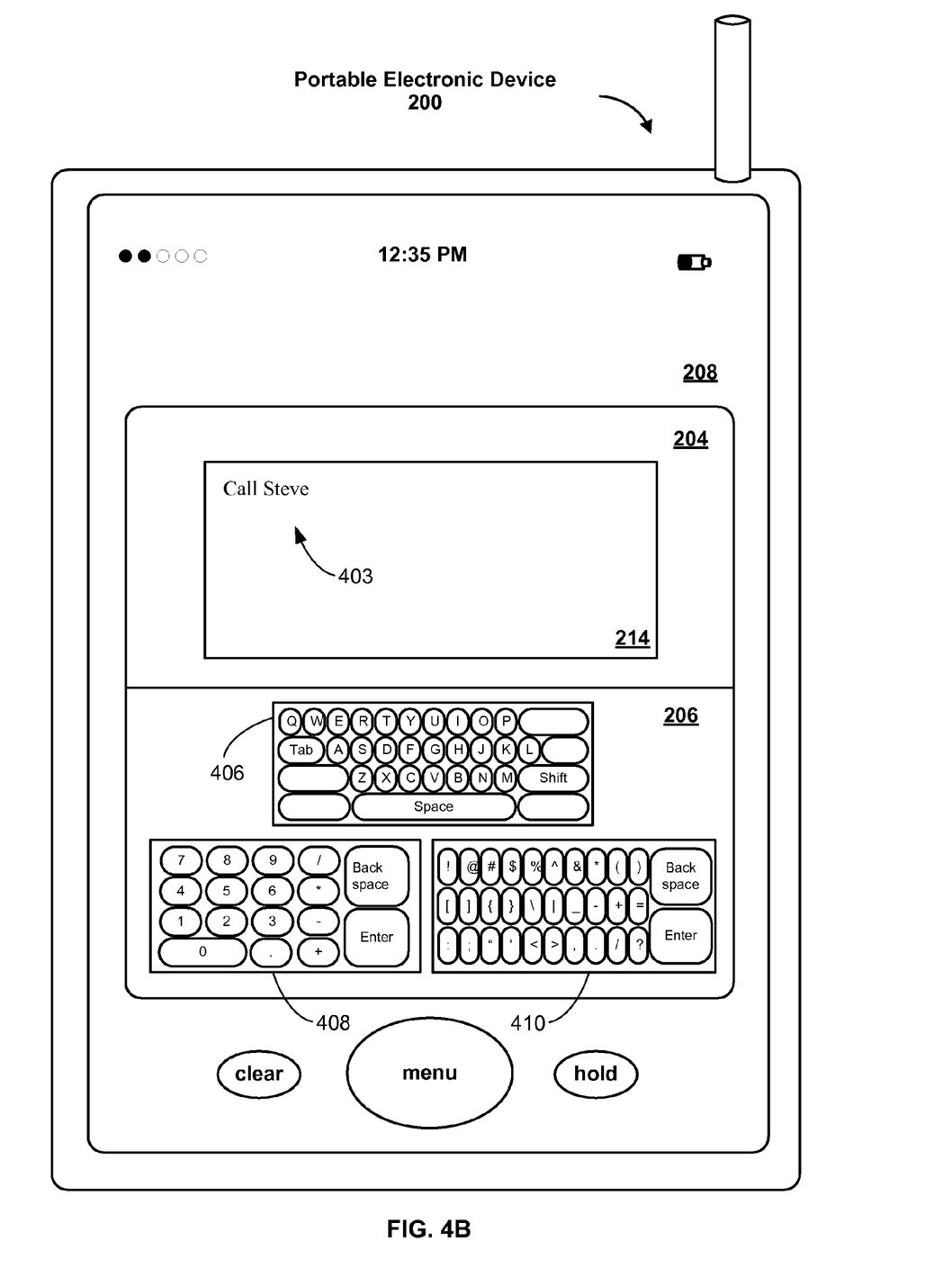
Figure 4C:
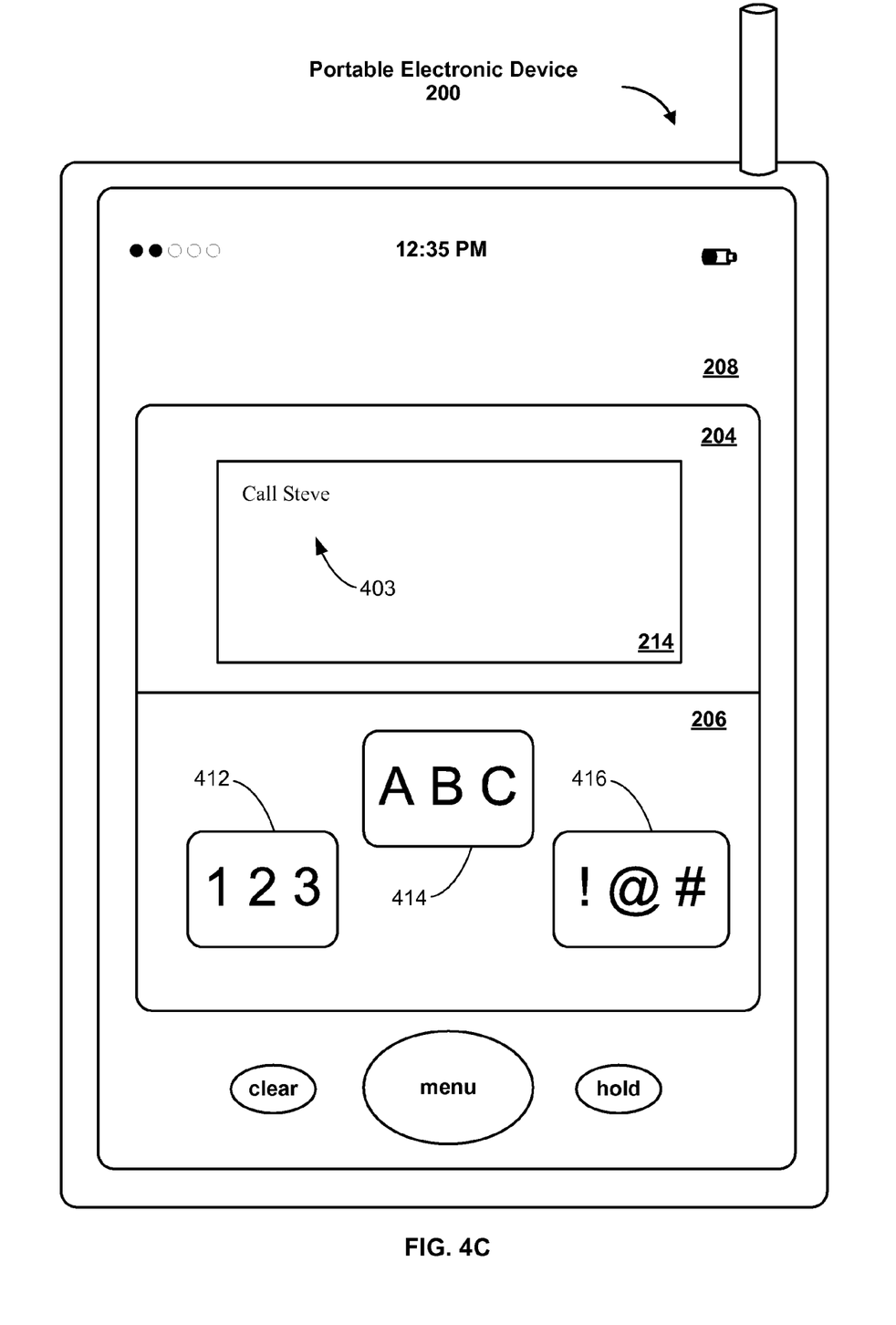
Figure 4D:
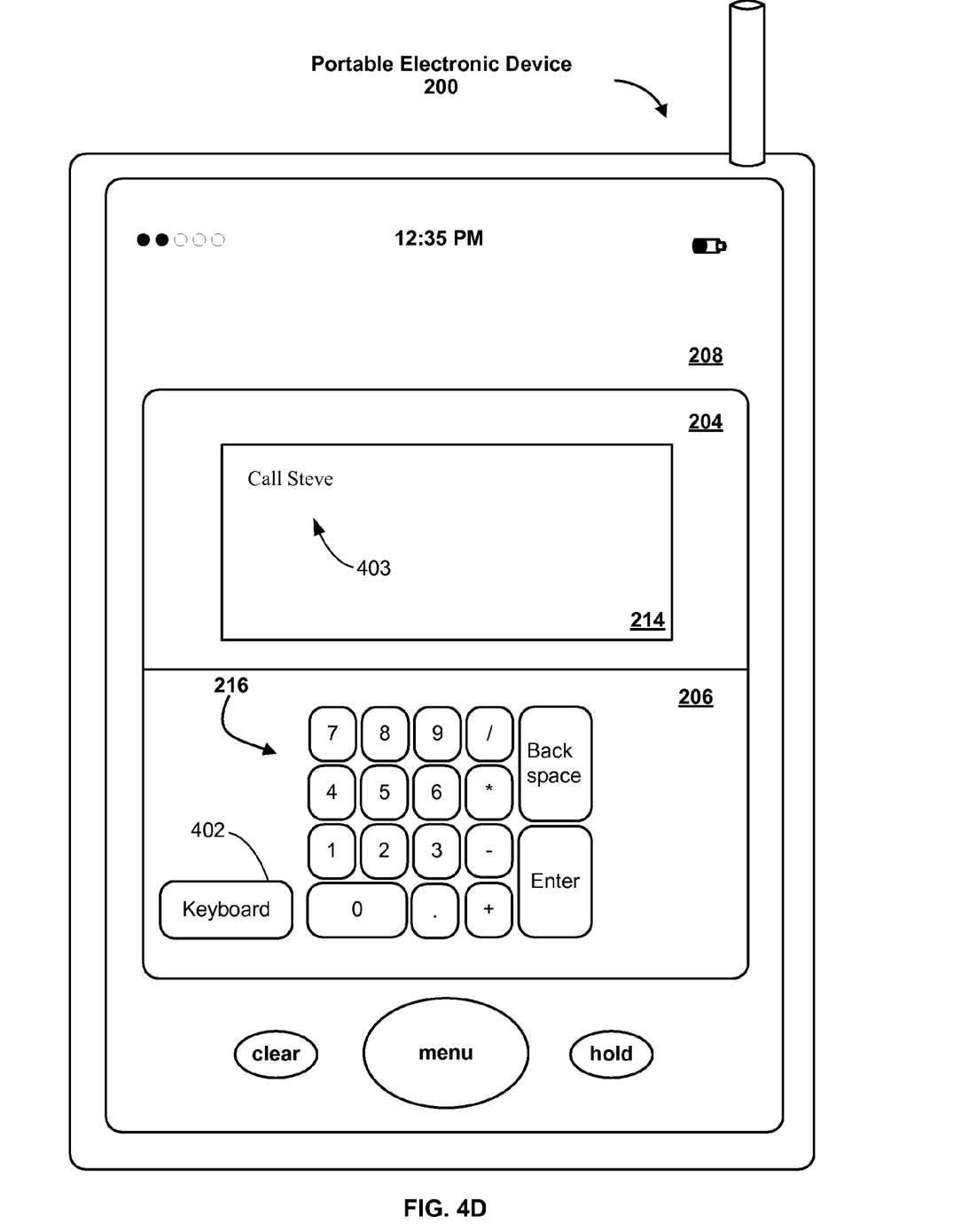
Figure 4E:
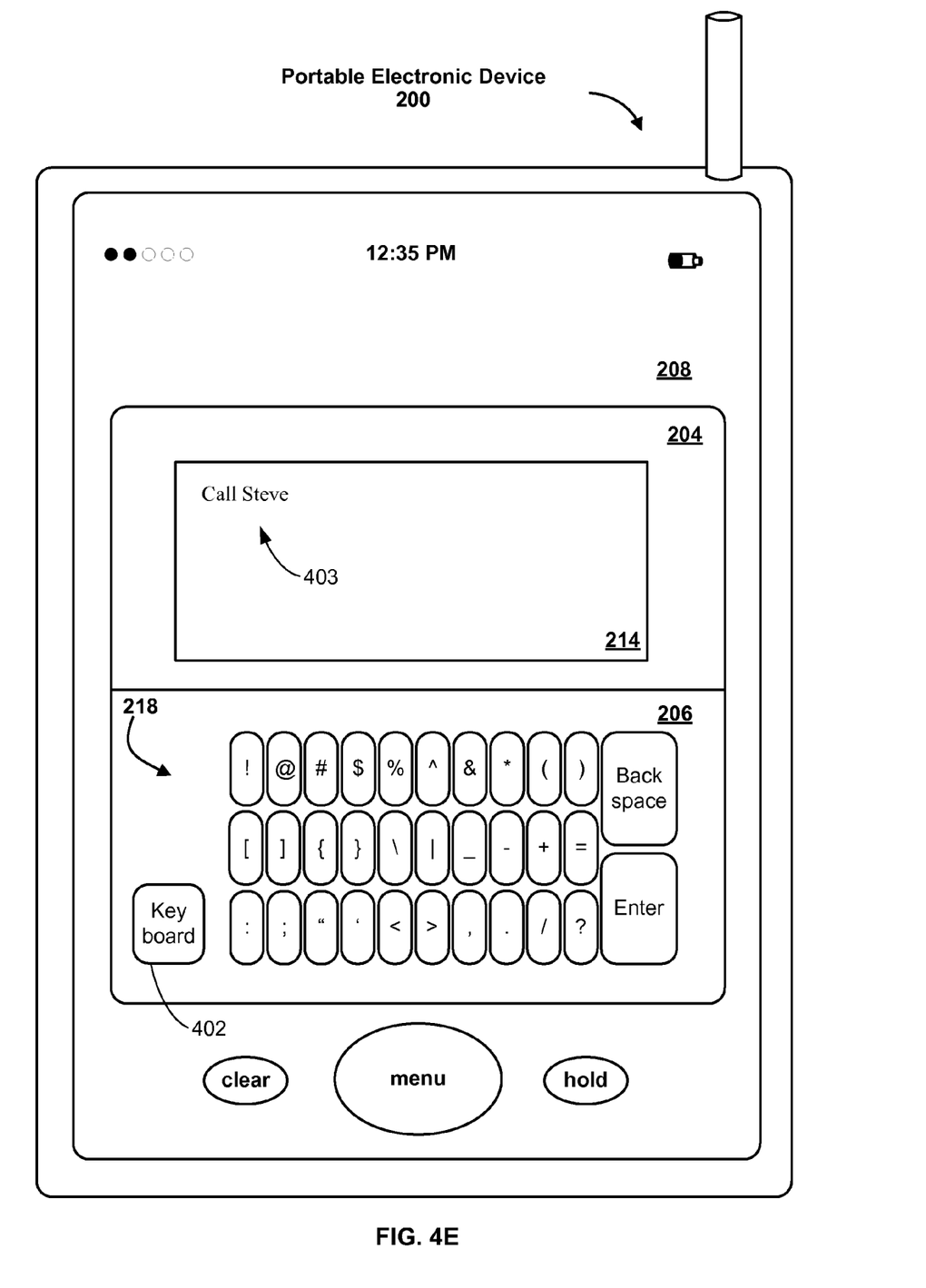
Figure 4F:
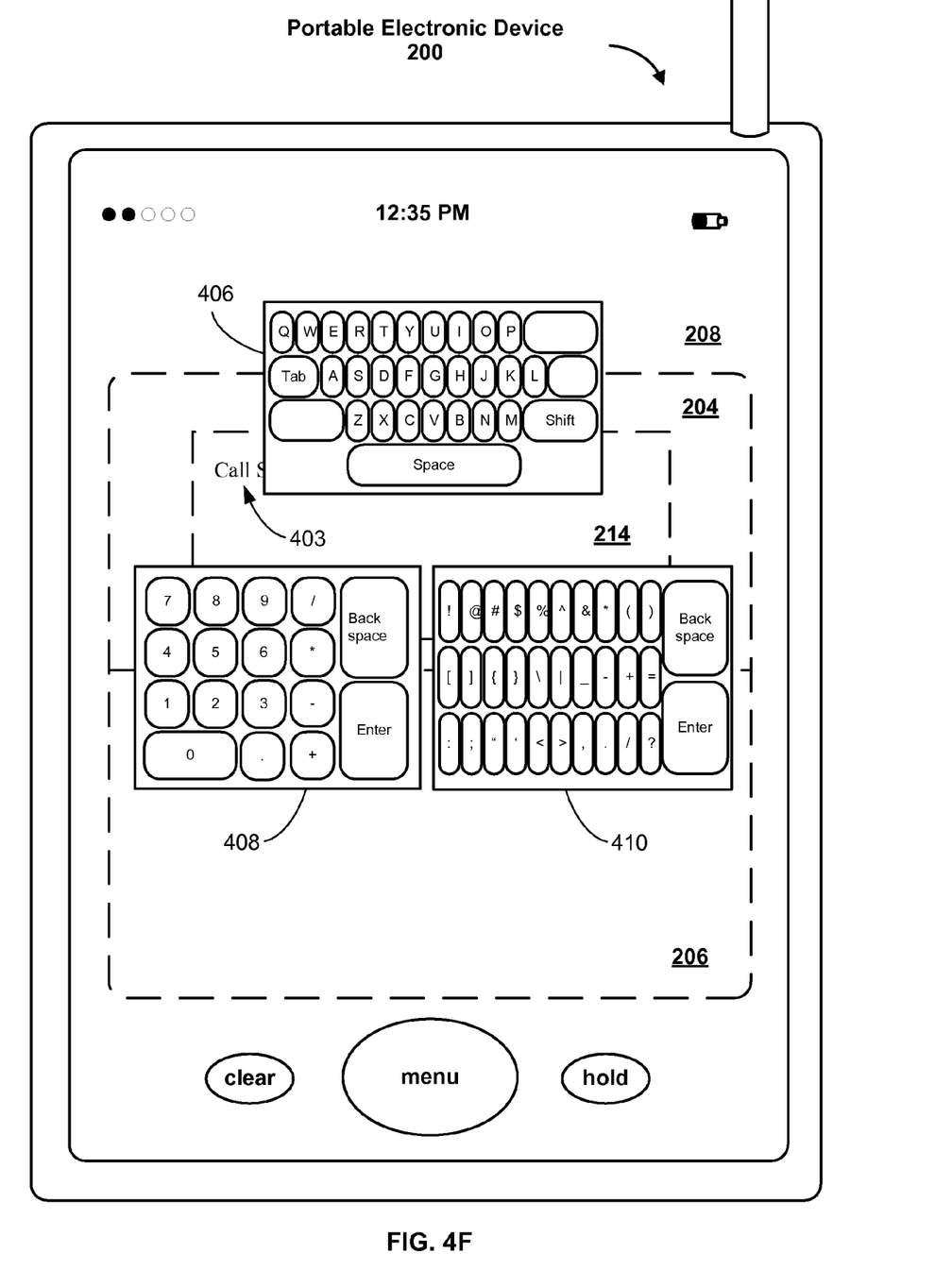

When the user selects the keyboard selection soft key 402 by making contact with the touch screen (e.g., with a finger 212, not drawn to scale) over the area of the keyboard key 402, a plurality of objects that correspond to a plurality of soft keyboards is shown, as illustrated in FIG. 4B, FIG. 4C, and FIG. 4F. In some embodiments, the objects are demagnified, zoomed out representations of the soft keyboards 210, 216, and 218, as in FIG. 4B and FIG. 4F. For example, the plurality of objects may include a demagnified letters soft keyboard 406 corresponding to letters soft keyboard 210, a demagnified numerals soft keyboard 408 corresponding to numerals soft keyboard 216, and a demagnified symbols keyboard 410 corresponding to symbols soft keyboard 218. In some embodiments, the demagnified keyboards are all displayed in the keyboard tray 206, as in FIG. 4B. In some other embodiments, the demagnified keyboards are displayed over the keyboard tray 206 and display tray 204, thereby obscuring the trays 204 and 206, as in FIG. 4F.

In some other embodiments, the objects are icons that include symbols representing the corresponding soft keyboards, as in FIG. 4C. For example, the plurality of objects may include an icon "A B C" 414 corresponding to the letters soft keyboard 210, an icon "1 2 3" 412 corresponding to the numerals soft keyboard 216, and an icon "! @ #" 416 corresponding to the symbols soft keyboard 218. The symbols "A B C," "1 2 3," and "! #" represent the letters soft keyboard, numerals soft keyboard, and symbols soft keyboard, respectively. In other embodiments, different letters, number and/or symbols may be shown in the icons 414, 412, 416. As with the demagnified keyboards, the icons may be displayed within the keyboard tray 206 or over the keyboard tray 206 and display tray 204, as described above.

Whether the objects are icons or demagnified representations of the soft keyboards, in some embodiments, the objects are displayed such that they do not overlap each other when displayed simultaneously. For example, icons 412, 414, 416 do not overlap each other when displayed, as shown in FIG. 4C. As another example, demagnified keyboards 406, 408, 410 do not overlap each other when displayed, as shown in FIG. 4B.

While the objects (whether they are icons or demagnified representations of soft keyboards) are displayed, none of the soft keyboards are operational. That is, the user cannot select any soft keyboard key while the objects are displayed. Even while the demagnified representations of the soft keyboards are displayed, the keys on those representations are not operational. Whatever soft keyboard that is active before the objects are displayed is made non-operational when the objects are displayed.

If the user selects the demagnified numerals keyboard 408 or the numerals icon 412 with his finger 212 or other appendage or object (not shown), the numerals soft keyboard 216 is displayed and made operational, as in FIG. 4D. If the user selects the demagnified symbols keyboard 410 or the symbols icon 416 with his finger 212 or other appendage or object (not shown), the symbols soft keyboard 218 is displayed and made operational, as in FIG. 4E. If the user selects the demagnified letters keyboard 406 or the letters icon 414 with his finger 212 or other appendage or object (not shown), the letters soft keyboard 210 is displayed and made operational, as in FIG. 4A.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a portable electronic device,
    displaying a single soft keyboard in a first area and a window in a second area on a display of the portable electronic device, wherein the window is configured to display characters selected using a plurality of soft keyboards, wherein the plurality of soft keyboards include a keyboard that is primarily letters, a keyboard that is primarily numbers, and a keyboard that is primarily symbols other than letters and numbers;

in response to selection of a keyboard selection soft key by a user, displaying simultaneously a plurality of objects that correspond to the plurality of soft keyboards;

in response to selection of one of the plurality of objects by the user, displaying in the first area the soft keyboard that corresponds to the selected object and making operational, of the plurality of soft keyboards, only the soft keyboard corresponding to the selected object.

2. A computer-implemented method, comprising: at a portable electronic device, displaying a single soft keyboard in a first area and a window in a second area on a display of the portable electronic device, wherein the window is configured to display characters selected using a plurality of soft keyboards;

in response to an input by a user, displaying simultaneously a plurality of objects that correspond to the plurality of soft keyboards;

in response to selection of one of the plurality of objects by the user, displaying in the first area the soft keyboard that corresponds to the selected object and making operational, of the plurality of soft keyboards, only the soft keyboard corresponding to the selected object.

3. The method of claim 2, wherein the first area is beneath the second area.

4. The method of claim 2, wherein the plurality of soft keyboards includes a keyboard that is primarily letters.

5. The method of claim 2, wherein the plurality of soft keyboards includes a keyboard that is primarily numbers.

6. The method of claim 2, wherein the plurality of soft keyboards includes a keyboard that is primarily symbols other than letters and numbers.

7. The method of claim 2, wherein the input by the user is selection of a keyboard selection soft key.

8. The method of claim 2, wherein the plurality of objects are simultaneously displayed in the first area.

9. The method of claim 2, wherein the plurality of objects are simultaneously displayed in the second area.

10. The method of claim 2, wherein the plurality of objects are demagnified images of the plurality of soft keyboards.

11. The method of claim 2, wherein the plurality of objects are icons with symbols that are representative of the plurality of soft keyboards.

12. The method of claim 2, wherein the plurality of objects do not overlap each other when displayed simultaneously.

13. The method of claim 2, wherein the display is a touch screen display.

14. The method of claim 13, wherein the user selects one of the plurality of objects by placing or tapping a finger on one of the plurality of objects on the touch screen display.

15. The method of claim 2, wherein the single soft keyboard in the first area is demagnified in response to the input by the user.

16. The method of claim 2, wherein the selected object is magnified so that it becomes the only soft keyboard in the first area.

17. The method of claim 2, wherein the device is a portable communications device.

18. A graphical user interface on a portable electronic device, comprising:

a first area that displays a soft keyboard;

a keyboard selection soft key;

an area that, in response to selection of the keyboard selection soft key by a user, displays simultaneously a plurality of objects that correspond to a plurality of soft keyboards; and a second area with a window that is configured to display characters selected using the plurality of soft keyboards;

wherein selection of an object in the plurality of objects by the user determines the soft keyboard displayed in the first area.

19. A portable electronic device, comprising:

a display;

one or more processors;

memory; and a program, wherein the program is stored in the memory and configured to be executed by the one or more processors, the program including:

instructions for displaying a single soft keyboard in a first area and a window in a second area on a display of the portable electronic device, wherein the window is configured to display characters selected using a plurality of soft keyboards;

instructions for, in response to an input by a user, displaying simultaneously a plurality of objects that correspond to the plurality of soft keyboards;

instructions for, in response to selection of one of the plurality of objects by the user, displaying in the first area the soft keyboard that corresponds to the selected object and making operational, of the plurality of soft keyboards, only the soft keyboard corresponding to the selected object.

20. A computer-program product, comprising:

a computer readable storage medium and a computer program mechanism embedded therein, the computer program mechanism comprising instructions, which when executed by a portable electronic device with a display, cause the device to:

display a single soft keyboard in a first area and a window in a second area on a display of the portable electronic device, wherein the window is configured to display characters selected using a plurality of soft keyboards;

in response to an input by a user, display simultaneously a plurality of objects that correspond to the plurality of soft keyboards;

in response to selection of one of the plurality of objects by the user, display in the first area the soft keyboard that corresponds to the selected object and making operational, of the plurality of soft keyboards, only the soft keyboard corresponding to the selected object.

21. A portable electronic device with a display, comprising:

means for displaying a single soft keyboard in a first area and a window in a second area on a display of the portable electronic device, wherein the window is configured to display characters selected using a plurality of soft keyboards;

in response to an input by a user, means for displaying simultaneously a plurality of objects that correspond to the plurality of soft keyboards;

in response to selection of one of the plurality of objects by the user, means for displaying in the first area the soft keyboard that corresponds to the selected object and making operational, of the plurality of soft keyboards, only the soft keyboard corresponding to the selected object.

* * * * *